April 4, 1950  R. D. RUSK  2,502,673
ELECTRICAL INVERTER SYSTEM

Filed Oct. 23, 1945

INVENTOR
Rogers D. Rusk
BY
Ward, Crosby & Neal
ATTORNEYS

Patented Apr. 4, 1950

2,502,673

UNITED STATES PATENT OFFICE 2,502,673

ELECTRICAL INVERTER SYSTEM

Rogers D. Rusk, South Hadley, Mass., assignor to Induction Heating Corporation, New York, N. Y., a corporation of New York Application October 23, 1945, Serial No. 623,944

1 Claim. (Cl. 250—36)

This invention pertains to electrical circuits and apparatus for converting direct current into alternating current of any frequency over a relatively wide range, for example, of the order of about one to twenty kilocycles per second.

Various types of circuits have heretofore been devised, employing one or more grid-controlled, gaseous discharge tubes, operating as automatic electrical switches, for periodically connecting a source of direct current voltage to a resonant circuit, of oscillatory characteristics, thereby to set up and maintain sustained oscillations in the resonant circuit, by virtue of the periodic shock excitation imposed thereon. Circuits of this character are generally referred to as "inverters."

Figure 1:
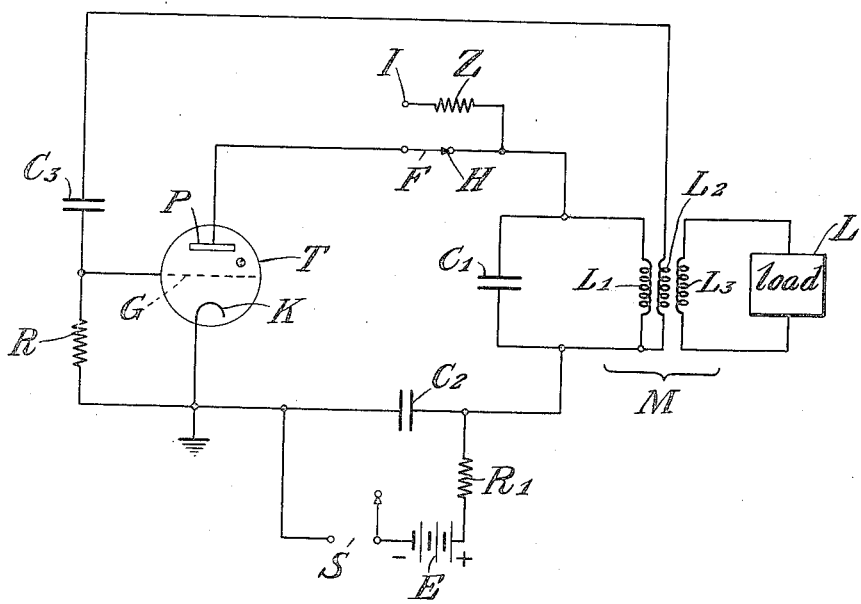
Figure 2:
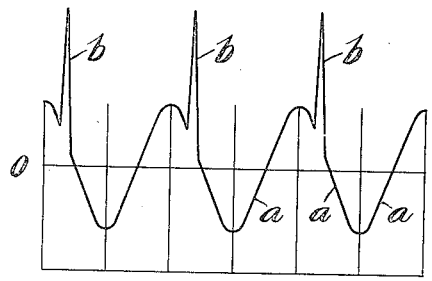

The present invention operates upon the above principles, but improves upon prior constructions by providing an extremely simple and efficient circuit of this type, the power output and oscillation frequency of which are easily controlled, the output frequency being a sine wave function of time. The circuit employs a resonant circuit for providing the output frequency, and a tube of the grid-controlled, gaseous discharge type provided with an excitation circuit coupling the resonant circuit with the grid, and an extinction circuit including a condenser in shunt to the source of shock excitation voltage, for purposes of automatic electrical switching as aforesaid. Other advantages and improvements of the circuit herein will become apparent from the following detailed description, making reference to the annexed drawing, wherein:

Fig. 1 shows the preferred circuit arrangement of apparatus in accordance with the invention; while Fig. 2 shows a graph illustrating the principles of operation of the circuit.

Referring now to Fig. 1, a grid-controlled, gaseous discharge tube T, such as a thyratron, has its anode P connected to the upper terminal of a parallel resonant tank circuit $L_1$, $C_1$, i. e., a tank circuit comprising an inductance $L_1$, connected in parallel with a capacity $C_1$, the resistance of this tank circuit being sufficiently low to provide oscillations which are damped as little as possible when subjected to a single pulse of shock excitation. The opposite terminal of the resonant circuit $L_1$, $C_1$ is connected through a condenser $C_2$ to the grounded thyratron cathode K. The circuit is energized by a source of direct current voltage E, applied in series with a resistance $R_1$ across condenser $C_2$ upon operation of a switch S. The thyratron control grid G is connected to the cathode through a biasing resistance R; and is also connected through a blocking condenser $C_3$ to an excitation coil $L_2$, inductively coupled to coil $L_1$ in the tank circuit, coil $L_2$ being further conductively connected, at its lower terminal, to the lower or cathode-connected terminal of the tank circuit as shown. Coil $L_2$ is so coupled to coil $L_1$ as to provide a grid signal having a phasing such as to fire the tube T at appropriate intervals to establish and maintain sustained oscillations, as explained hereinafter. The plate P is connected to the upper terminal of the tank circuit $L_1$, $C_1$ through a switch F, which may be operated to a contact H to provide a direct connection to the tank circuit, or may be operated to a contact I to include an impedance Z, in the connection, which may be a relatively small inductance or resistance, having a current-limiting function as explained below. Also, an output coil $L_3$, the terminals of which are connected to a load circuit L, is inductively coupled to coil $L_1$ of the tank circuit for transferring the high frequency power output to the load circuit.

In the operation of the device, assume that voltage E is suddenly applied to the circuit, as by closing switch S. Condenser $C_2$ charges up to the voltage E, through resistance $R_1$, whereupon substantially the full voltage E is impressed between the cathode K and plate P of the thyratron, since, at this instant, no charge exists on condenser $C_1$ in series therewith. At the same time, the grid potential is swung momentarily positive owing to the charging current for condenser $C_3$ flowing in the excitation circuit $RC_3L_2$. Accordingly, the thyratron will fire and charge up condenser $C_1$ almost instantaneously approximately to the voltage E, since the voltage drop across the thyratron is small once it is fired as aforesaid. When the tube fires, the condenser $C_2$ discharges rapidly through condenser $C_1$ up to the point where its polarity starts to reverse, thereby extinguishing the discharge of the tube. Condenser $C_1$ concurrently discharges through coil $L_1$, in oscillatory fashion, owing to the low damping constant of the tank circuit. As a result of this oscillatory discharge in the tank circuit, the thyratron plate voltage will be swung alternately more and less positive with respect to the cathode. Meantime, owing to the excitation circuit extending from coil $L_2$ to the grid, the grid voltage will be swung alternately negative and positive, but with a phasing such, due to condenser $C_3$ and resistance R, that shortly after the plate voltage attains its maximum value, the grid will be swung sufficiently positive to fire the tube, resulting in a repetition of the cycle aforesaid. In this way, sustained oscillations of the substantially pure sinusoidal output, may be established and maintained, so long as switch S remains closed to connect the direct current voltage source E to the circuit.

Fig. 2 shows graphically instantaneous values for current or voltage in the resonant circuit $L_1C_1$, plotted as ordinates against time as abscissae. The sinusoidally varying portions of the graph as depicted at $a$, represent the oscillatory current in the resonant circuit, while sharply peaked portions $b$ show the charging periods while the thyratron is firing. It will be noted that the charging periods $b$ constitute but an extremely small fraction of the cyclical variation $a$ of current or voltage in the resonant circuit. This short firing time thus gives a long deionization time for recovery of the tube between firing intervals. This feature constitutes one of the important advantages of the circuit above described.

By way of summary, it may be stated that the oscillatory circuit $L_1C_1$ is energized by successive pulses of current through the thyratron tube T. These pulses are automatically initiated by means of excitation signals to the grid of the tube supplied from coil $L_2$ through condenser $C_3$; and said pulses are thereafter automatically extinguished by discharge of the condenser $C^2$ through condenser $C_1$ and the tube T. The current through the tube, once initiated, would flow thereafter continuously, but for the presence of the extinguishing condenser $C_2$.

In order to limit the current flow in the space path of tube T, and thereby to protect the tube against the flow therein of excessively high currents, it is preferable to operate switch F to contact I, thereby to include a small current-limiting impedance Z, which may be a small resistance or inductance, in series with the space path of the tube.

In the grid-exciting circuit $L_2C_3R$, the capacity $C_3$ serves, in one function, to block the direct current voltage E off of the grid. The strength of the grid signal is determined by the degree of coupling between coils $L_2$ and $L_1$, by the size of condenser $C_3$ and also the magnitude of the biasing voltage produced on the grid. The combination of resistor R and capacity $C_3$ also acts as a phasing network, which controls the phase of the grid voltage, as compared to the plate voltage. By appropriately adjusting the values $C_3$ and R, this phasing may be varied as desired for any particular operation. In order for the tube to be in a non-conducting state for the remainder of each cycle, following the brief interval during which it is fired, and thus to be ready to fire and conduct the energizing impulse at the proper time of the next cycle, the discharge in the tube must be promptly extinguished, and the tube must have time to lose its conductivity and de-ionize before the next impulse. This is largely the function of the capacity $C_2$, across which the direct current voltage source E is connected.

The following are representative values for the various components of the above circuit, to provide operation at a frequency within the range of about 1 to 20 kilocycles per second:

| | |
|---|---|
| Coil $L_1$ | 10 millihenries |
| Coil $L_2$ | 360 microhenries |
| Condenser $C_1$ | 0.1 microfarad |
| Condenser $C_3$ | 0.13 microfarad |
| Condenser $C_2$ | 0.5 microfarad |
| Resistor R | 15000 ohms |
| Resistor $R_1$ | 470 ohms |
| Impedance Z | 150 microhenries |
| Thyratron T | gas filled thyratron |
| Direct voltage source E | 2700 volts. |

I claim:

An inverter system, comprising: a gaseous discharge tube having anode, cathode and control grid electrodes, said tube being of the type in which the grid loses control upon initiation of the gaseous discharge; a resonant circuit, of oscillatory characteristics, containing inductance and capacity in parallel; connections extending from the opposite ends of said resonant circuit to said anode and cathode respectively; a condenser interposed in said cathode connection; means for impressing a source of direct current voltage, in series with a resistance, across said condenser; a biasing resistance connected between said cathode and control grid; and an alternating current connection extending from said cathode to said control grid, said connection containing a coil inductively coupled to said inductance, and a grid blocking condenser in series therewith.

ROGERS D. RUSK.

REFERENCES CITED

The following references are of record in the file of this patent:

UNITED STATES PATENTS

| Number | Name | Date |
|---|---|---|
| 2,056,011 | Lowell | Sept. 29, 1936 |
| 2,090,951 | Schlesinger | Aug. 24, 1937 |
| 2,228,276 | Levan | Jan. 14, 1941 |
| 2,390,659 | Morrison | Dec. 11, 1945 |